US008447635B2

(12) United States Patent
Nesgos

(10) Patent No.: US 8,447,635 B2
(45) Date of Patent: May 21, 2013

(54) SYSTEM AND METHOD FOR MANAGING INVESTMENT RISK IN SATELLITE OPERATOR COMPANIES

(76) Inventor: Peter D. Nesgos, New York, NY (US)

( * ) Notice: Subject to any disclaimer, the term of this patent is extended or adjusted under 35 U.S.C. 154(b) by 0 days.

(21) Appl. No.: 13/373,648

(22) Filed: Nov. 23, 2011

(65) Prior Publication Data
US 2012/0072248 A1 Mar. 22, 2012

Related U.S. Application Data

(63) Continuation of application No. 12/072,038, filed on Feb. 22, 2008, now Pat. No. 8,069,065.

(60) Provisional application No. 60/892,096, filed on Feb. 28, 2007.

(51) Int. Cl.
G06Q 40/00 (2006.01)

(52) U.S. Cl.
USPC .............. 705/4; 705/35; 705/36 R; 705/36 T; 705/38; 705/39; 705/40; 463/25

(58) Field of Classification Search
USPC ............ 705/4, 35, 36 R, 36 T, 38–40; 463/25
See application file for complete search history.

(56) References Cited

U.S. PATENT DOCUMENTS

| 6,192,347 | B1 | 2/2001 | Graff | |
|---|---|---|---|---|
| 7,386,463 | B2 | 6/2008 | McCabe | |
| 7,587,325 | B1 | 9/2009 | Scott | |
| 2002/0010684 | A1 | 1/2002 | Moskowitz | |
| 2003/0028456 | A1 | 2/2003 | Yolles | |
| 2005/0055248 | A1* | 3/2005 | Helitzer et al. | 705/4 |
| 2005/0251478 | A1 | 11/2005 | Yanavi | |

OTHER PUBLICATIONS

Sky risks loss of satellite; [2 Edition] Vaughan, Gareth. The Press. Christchurch, New Zealand: Sep. 13, 2006. p. C.1.*
International Search Report PCT/US08/05231, Jul. 14, 2008.
Insurance firms hire NASA to find two satellites, Wall Street Journal, NY NY Oct. 23, 1984.
Shapiro, Stacy "Abundance of capacity reducing satellite rates"; Bus Ins, May 5, 1997.

* cited by examiner

Primary Examiner — Harish T. Dass
(74) Attorney, Agent, or Firm — Milbank, Tweed, Hadley & McCloy LLP

(57) ABSTRACT

In order to mitigate risk of satellite investment loss, a satellite loss event or failure event for a satellite that will be operated by a satellite operator company is identified. Financial investors in the satellite operator company are identified. Actuarial data corresponding to prior satellite loss events or failure events substantially corresponding to the satellite loss event or failure event are identified. An investment loss mitigation insurance policy based at least in part on the identified actuarial data is developed. The investment loss mitigation insurance policy is offered to the identified financial investors. Premiums are received from financial investors that subscribe to the investment loss mitigation insurance policy, and the investment loss mitigation insurance policy is placed with an underwriting pool in exchange for at least a portion of the received premiums.

20 Claims, 6 Drawing Sheets

SYSTEM AND METHOD FOR MANAGING INVESTMENT RISK IN SATELLITE OPERATOR COMPANIES

This application is a continuation of and claims priority to U.S. application Ser. No. 12/072,038, entitled System and Method for Managing Investment Risk in Satellite Operator Companies, filed on Feb. 22, 2008, (issued as U.S. Pat. No. 8,069,065) which is a regular U.S. patent application that claims priority to U.S. Provisional Application Ser. No. 60/892,096, entitled System and Method for Managing Investment Risk in Satellite Operator Companies, filed Feb. 28, 2007, the disclosures of which are incorporated herein by reference.

The present invention relates to investment protection insurance and more particularly to systems and methods to quantify risk for, determine premium rates for and aggregate and protect equityholders and debtholders in publicly and privately traded securities for loss of investment in satellite operator companies in the event of total or partial loss of satellites.

BACKGROUND

Property insurance covering loss or failure of satellites has existed for more than forty years. This insurance is first party property insurance to compensate the owner of a satellite in the event of the total or partial loss of its satellite either as a result of a failure at launch or during the in-orbit lifetime of the satellite. This insurance customarily covered the capital cost of the satellite, the price of the launch services (in the case of launch insurance) and the cost of the premium, usually on an agreed value basis (in the case of launch insurance) or based on the declining net book value of the satellite (in the case of in-orbit insurance). At one time in the past, this insurance included a component of business interruption loss and extra expenses incurred in securing replacement capacity or modifying ground equipment to accommodate satellite deficiencies. This insurance has been underwritten traditionally by a specialist property insurance market.

More recently, coverage has been placed on a one-off basis by a single bondholder in a satellite project on an agreed value basis, rated and with coverage terms substantially equivalent to satellite operator property launch insurance. However, the terms of the policy, method of placement and other details of the process for issue of the policy differ significantly from the terms, method of placement and other details described herein.

Equity shareholders and bondholders in publicly and privately traded securities of satellite operators still remain unprotected from the possible drastic diminution in value of their securities resulting from the loss or failure of satellites owned by the satellite operators in which they have invested. This is because of the significant cost of procuring a separate policy of insurance rated on the same basis as the property insurance of the satellite operator, for relatively small amounts of insurance on an agreed value basis, whereas the rating should more properly be determined based on the likely diminution in value of the securities (versus the loss of the satellite) based on historical experience and for the actual diminution in value of the securities versus an agreed value that may have no bearing on the actual loss suffered.

The preceding description is not to be construed as an admission that any of the description is prior art relative to the present invention.

SUMMARY OF THE INVENTION

In various aspects, the system and method mitigate risk of satellite investment loss. The system and method comprise identifying at least one satellite loss event or failure event for a satellite that will be operated by a satellite operator company, and identifying a plurality of financial investors in the satellite operator company. The system and method further comprise identifying actuarial data corresponding to prior satellite loss events or failure events substantially corresponding to the at least one satellite loss event or failure event and developing an investment loss mitigation insurance policy based at least in part on the identified actuarial data. The system and method further comprise offering the investment loss mitigation insurance policy to the identified financial investors and receiving premiums from financial investors that subscribe to the investment loss mitigation insurance policy. The system and method further comprise placing the investment loss mitigation insurance policy with an underwriting pool in exchange for at least a portion of the received premiums.

In another aspect, the system and method further comprise identifying an actual satellite loss event or failure event, determining whether the actual satellite loss event or failure event is covered by the investment loss mitigation insurance policy, and responsive to determining whether the actual satellite loss event or failure event is covered, paying the financial investors. In another aspect, the system and method further comprise identifying an actual satellite loss event or failure event, determining whether the underwriting pool has salvage rights under the investment loss mitigation insurance policy, and responsive to determining whether the underwriting pool has salvage rights, transferring financial instruments to the underwriting pool as salvage or a sharing of any future upside in share/bond performance, such as in the case of partial loss coverage. In another aspect of the system and method, the at least one satellite loss event or failure event is a launch failure. In another aspect of the system and method, the at least one satellite loss event or failure event is a launch loss. In another aspect of the system and method, the at least one satellite loss event or failure event is an in-orbit failure. In another aspect of the system and method, the at least one satellite loss event or failure event is a premature in-orbit loss of capacity. In another aspect of the system and method, offering the investment loss mitigation insurance policy to the identified financial investors occurs a predetermined number of days before launch. In another aspect of the system and method, offering the investment loss mitigation insurance policy to the identified financial investors occurs after successful in-orbit checkout and a predetermined number of days before annual expiry. In another aspect of the system and method, the underwriting pool is at least partially in a financial products market. In another aspect of the system and method, the underwriting pool is at least partially in a satellite property insurance underwriting market. In another aspect of the system and method, identifying actuarial data corresponding to prior satellite loss events or failure events substantially corresponding to the at least one satellite loss event or failure event considers difference between average financial instrument performance for a period of time immediately before and after a satellite loss event or failure. In another aspect of the system and method, identifying actuarial data corresponding to prior satellite loss events or failure events substantially corresponding to the at least one satellite loss event or failure event considers an agreed value of investment based on a set financial instrument value. In another aspect of the system and method, identifying actuarial data corresponding to prior satellite loss events or failure events substantially corresponding to the at least one satellite loss event or failure event considers an intrinsic value of investment based on recognized value metrics or methodologies. In another aspect of the system and method, the final pool of investors and the adjusted value of their investment in the Satellite operator and the final insured amount at the time of attachment of risk is determined. In another aspect of the system and method, the at least one satellite loss event or failure event for a satellite is a total loss. In another aspect of the system and method, the at least one satellite loss event or failure event for a satellite is a partial loss. In another aspect of the system and method, the at least one satellite loss event or failure event for a satellite is a reduction in expected lifetime. In another aspect of the system and method, the at least one satellite loss event or failure event for a satellite is a reduction in available power.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

Figure 1:
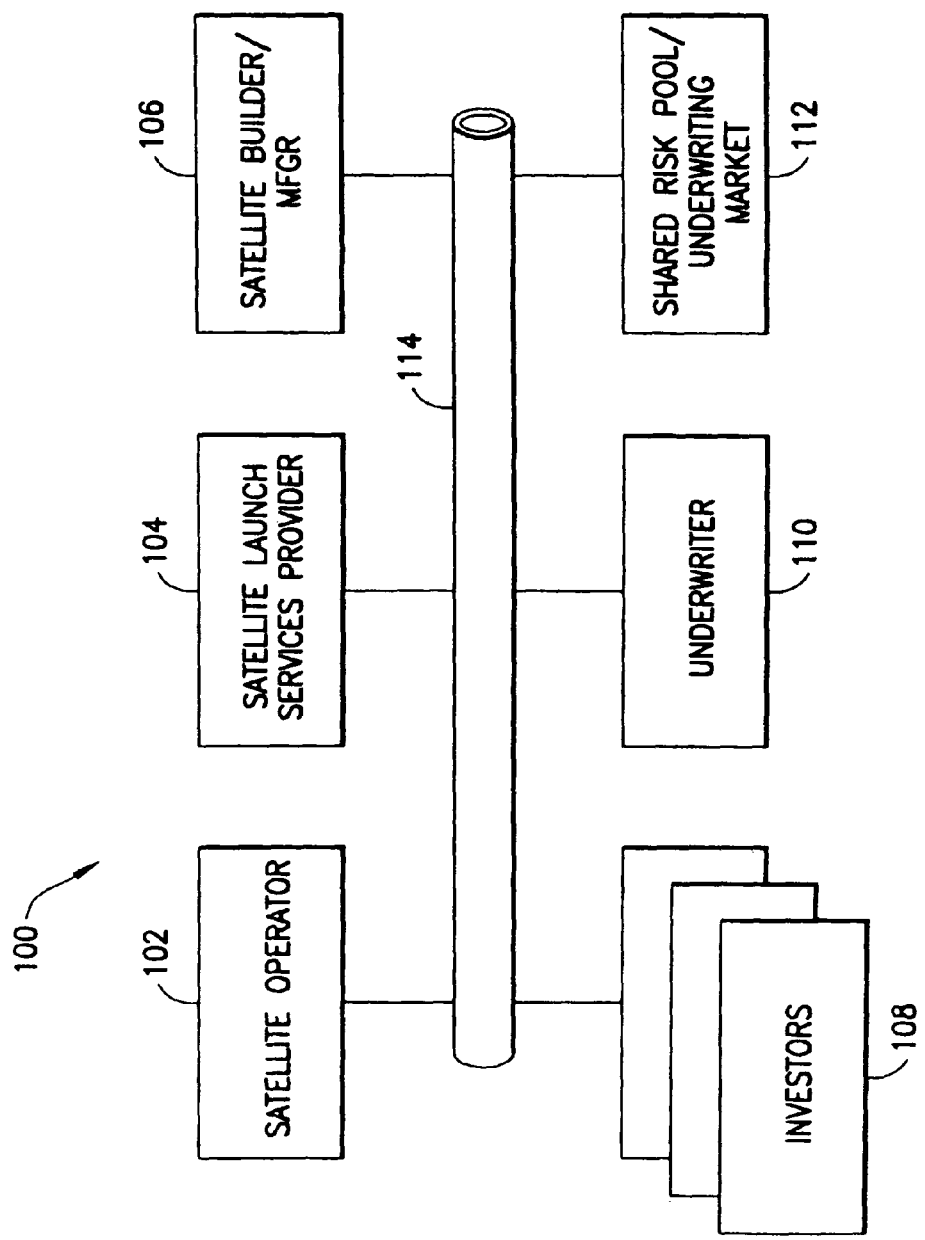
FIG. 1 illustrates a system according to an example embodiment.

It is understood that the drawings are for illustration only and are not limiting.

DETAILED DESCRIPTION OF THE DRAWINGS

In the various described embodiments, systems and methods provide insurance to protect against loss of investment value of a shareholder or bondholder of a satellite operator with publicly or privately traded securities resulting from catastrophic loss or failure of a satellite at launch or while in orbit.

Differences from Prior Forms of Protection

The systems and methods of the various described embodiments are different from other prior or known forms of protection. By way of example, in one or more embodiments, the system and method is designed for financial investors in publicly and privately traded satellite operator companies (although it is not limited to this class of insured).

In one or more embodiments, the system and method is offered to all or nearly all investors creating an insured pool or group, thereby reducing potential insurance capacity issues (i.e. numerous individual investors seeking more insurance than is available with respect to the same risk, or multiple potential insureds using different policy terms and conditions). The placement process may be unique in that it entails the aggregation of insureds by an offer to subscribe to a particular placement during a predetermined period of time, such as 30-90 days before launch or, for in-orbit insurance, such as 30-90 days before annual expiry. The terms of the participation of investors as represented by the agent would be embodied in a separate investor agency agreement. The insurance could be placed in conjunction with the satellite operator placement, but it is not necessarily so placed.

In one or more embodiments, coverage under the system and method may be placed in the financial products as well as the satellite property insurance underwriting markets.

In one or more embodiments, insurance under the system and method may be available for launch and initial in-orbit placement and for in-orbit risks while a satellite is in-orbit.

In one or more embodiments, coverage under the system and method may apply to satellites (or a payload thereof) that satellite operators own or to satellites that satellite operators lease or purchase all (or a significant proportion) of the capacity thereon.

In one or more embodiments, insurance under the system and method may be rated based on historical share and bond performance after a satellite loss or failure versus on the loss experience for the satellite and, in the case of launch coverage, its launch vehicle.

In one or more embodiments, loss under the system and method may be determined based on one of the following: (1) the difference between average share/bond performance for a period of time immediately before and after a satellite loss or failure; (2) an agreed value of the investment based on a set share or bond price; or (3) the intrinsic value of the stock or debt of the company based on recognized value metrics or methodologies.

In one or more embodiments, types of loss scenarios covered under the system and method may be varied, depending on the insured's requirements: total loss only; total/constructive total loss; comprehensive; total/constructive total/partial loss; reduction in expected lifetime; reduction in available power.

In one or more embodiments, the period of coverage under the system and method may be varied, depending on the insured's requirements: e.g., launch through separation; launch through in-service acceptance, launch plus one year, annual for in-orbit.

In one or more embodiments, salvage available to insurers under the system and method may be different from satellite property insurers as it would be based on a transfer of the shares or bonds for which a loss has been paid or a sharing of any future upside in share/bond performance, such as in the case of partial loss coverage.

In one or more embodiments, separate arrangements under the system and method may be structured with insurers and one or more distressed equity/debt fund buyers to facilitate the sale of any shares/bonds that insurers have received as salvage.

In one or more embodiments, separate arrangements under the system and method may be arrived at with satellite manufacturers and launch services providers to assist in the description of the risk at underwriter presentations (either in conjunction with the satellite operator placement or separately) and in the presentation and settlement of any claim.

In one or more embodiments, separate agreements under the system and method may be developed with the satellite operator whereby the operator would share loss formulations, provide insureds with notices of occurrence and proofs of loss and assist in claims settlement.

Example Methods to Identify Actuarial Data

In one or more embodiments, the system and method may use various different methods to identify actuarial data corresponding to prior satellite loss events or failure events. By way of example, the system and method may undertake a study of share/bond performance of satellite operators based on performance of shares/bonds before and after satellite loss or failure. Such a study may involve total and partial losses and also different size satellite operators (those that operate one or a small number of satellites versus those that operate a large fleet). Such a study may also consider performance of shares/bonds after successful launch to determine value enhancement. Such a study may also run sensitivity analyses based on different criteria to determine whether additional factors influence share/bond performance (e.g., market served, competition, capacity pricing, availability of replacement capacity) and weight factors based on an agreed formula.

In one or more embodiments, the system and method may also determine a premium rating based on historical investment loss data not on satellite/launch vehicle failure data (e.g., rate for multi-satellite operator should be far less than for a single satellite operator whether or not satellite is considered risky).

In one or more embodiments, the system and method may retain a share/bond-tracking agent or consultant to provide and maintain current lists of satellite operator shareholders and bondholders of publicly and privately traded satellite operators.

In one or more embodiments, the system and method may conduct an assessment of distressed value (post loss) and set up a facility for insurers to trade back bonds to vulture funds, for a commission payable by insurers to placing broker.

Example Methods to Place Coverage

In one or more embodiments, the system and method may use various different methods to place coverage with an underwriting pool. By way of example, in one or more embodiments, the system and method may select licensed, experienced space insurance broker(s) to place insurance. In one or more embodiments, the system and method may also identify lead underwriter(s) knowledgeable in financial risks and satellite coverages. In one or more embodiments, the system and method may establish a pool of rated underwriters to market placements. In one or more embodiments, the system and method may monitor launch activity involving publicly and privately traded satellite operators and timely approach prospective insureds. In one or more embodiments, the system and method may identify risk profile, involving coverage period, loss formulation and insured value. In one or more embodiments, the system and method may establish an insured group. In one or more embodiments, the system and method may negotiate investor agency agreements regarding identifying insured parties, insured securities, relative shares/premium obligations, loss formula and obligations of agent. In one or more embodiments, the system and method may coordinate underwriter presentations independently or in conjunction with the satellite operator. In one or more embodiments, the system and method may develop an appropriate rating, conclude the policy, and complete placement.

Example Methods for Policy Development

In one or more embodiments, the system and method may use various different methods to develop the underlying policies. By way of example, in one or more embodiments, the system and method may develop modular, standard form policy adaptable to various risk profiles. In one or more embodiments, the system and method may develop an approach to definition of what constitutes loss or failure matching or based on satellite operator's insurance (or default to or cross-reference satellite operator's policy). In one or more embodiments, the system and method may tailor conditions standard in satellite property policies to nature of insured group (e.g., no due diligence condition and limited insureds' duties regarding notice of occurrence and proof of loss (link to satellite operator obligations under separate satellite operator insurance)). In one or more embodiments, the system and method may provide a form of breach of warranty cover whereby the insured group may rely on the launch or in-orbit insurance policy of the satellite operator but not be deemed coverage under its separate investment protection insurance in the event an act or omission of the satellite operator voids or nullifies its own coverage. In one or more embodiments, the system and method may provide that salvage for insurers upon payment of the claim would be the shares or bonds held by the insured in the event of full coverage and total/constructive total loss (or no salvage or shared/all upside if shares/bonds trade up over time for partial losses, if covered). This may also include creation of a distressed sale facility with a vulture fund. In one or more embodiments, the system and method may consider creating a standard form agreement with a satellite operator for coordinated placement of the policy and satellite operator launch/in-orbit insurance including placement strategy, underwriter presentations, determination of loss definitions and responsibilities for preparing and filing notices of occurrence and proofs of loss.

Example System

Referring to FIG. 1, an example of system 100 according to one embodiment of the invention includes satellite operator 102, satellite launch services provider 104, satellite builder/manufacturer 106, investors 108, underwriter(s) 110, and shared risk pool/underwriting market 112. In system 100, satellite operator 102, satellite launch services provider 104, satellite builder/manufacturer 106, investors 108, underwriter(s) 110, and shared risk pool/underwriting market 112 are electronically interconnected by network 114. Although not illustrated, satellite operator 102, satellite launch services provider 104, satellite builder/manufacturer 106, investors 108, underwriter(s) 110, and shared risk pool/underwriting market 112 include various forms of computers and associated peripherals and components. These may be general or special purpose computers, each with one or more central processing units (CPU), fixed or removable storage for program code and program data (hard drive, floppy drive, CD, DVD, etc.), volatile and non-volatile memory, I/O devices (keyboards, display screens, printers, pointing devices, etc.), and network interface devices (WiFi, Ethernet, Modem, etc.). Network 114 may be one or more of a local area network (LAN), a wide area network (WAN), the Internet, or the public switched telephone network (PSTN).

Figure 2:
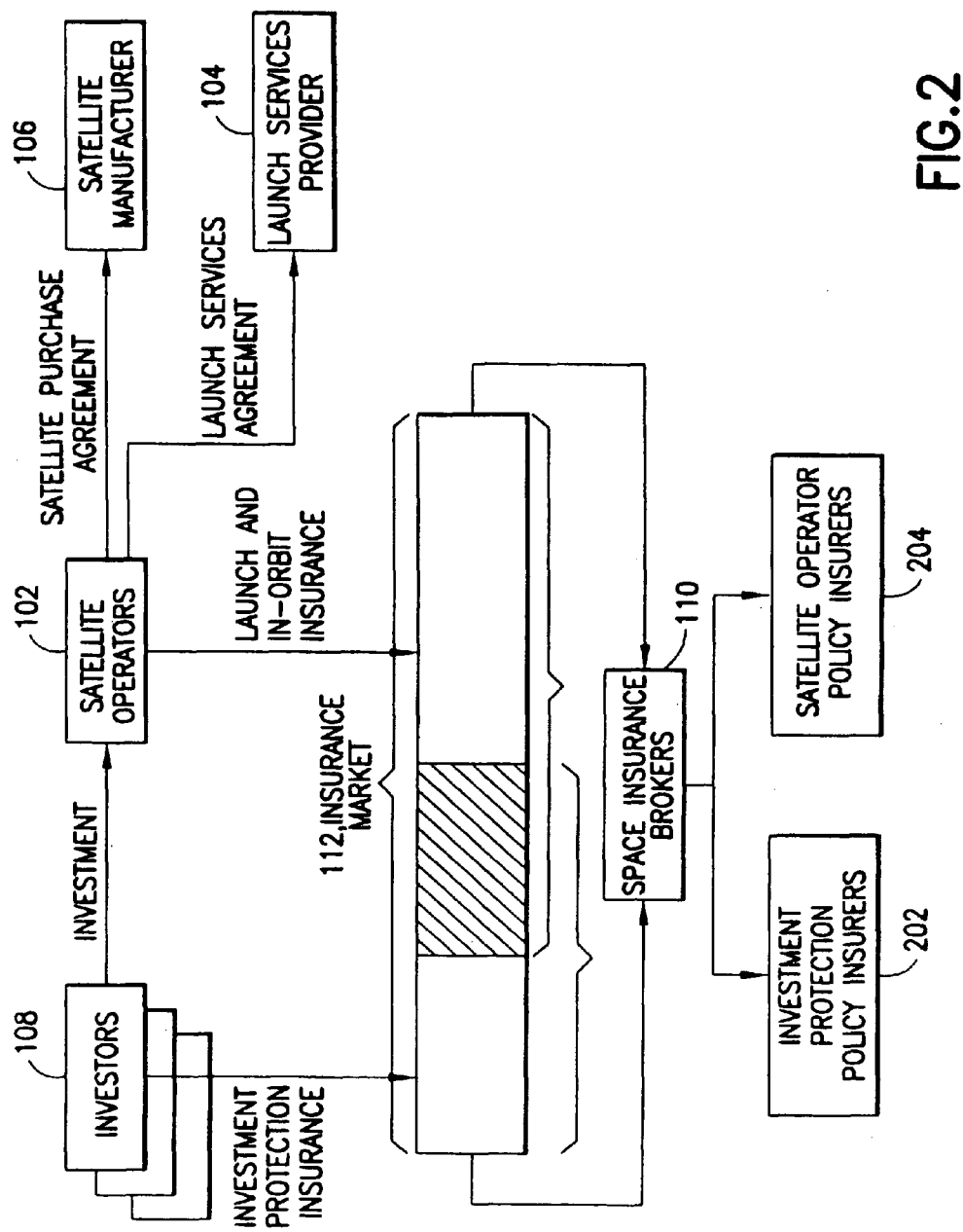
FIG. 2 illustrates relationships between parties in a system according to an example embodiment.

Referring to FIG. 2, some of the relationships of the entities identified in FIG. 1 are illustrated. Investors 108 make or place investments with satellite operators 102, in the form of stock purchases or subscriptions, or bond purchases. Satellite operators 102 enter into satellite purchase agreements with satellite builders/manufacturers 106. Satellite operators 102 also enter into launch services agreements with satellite launch service providers 104. Satellite operators 102 also obtain launch and in-orbit insurance from insurance market 112, procuring insurance from underwriters through the services of space insurance brokers 110. Investors 108 also obtain investment protection insurance from insurance market 112, procuring insurance from underwriters through the services of space insurance brokers 110. Space insurance brokers 110 place the policies of investors 108 and satellite operators 102 with investment protection policy insurers 202 and satellite operator policy insurers 204 respectively.

Figure 3:
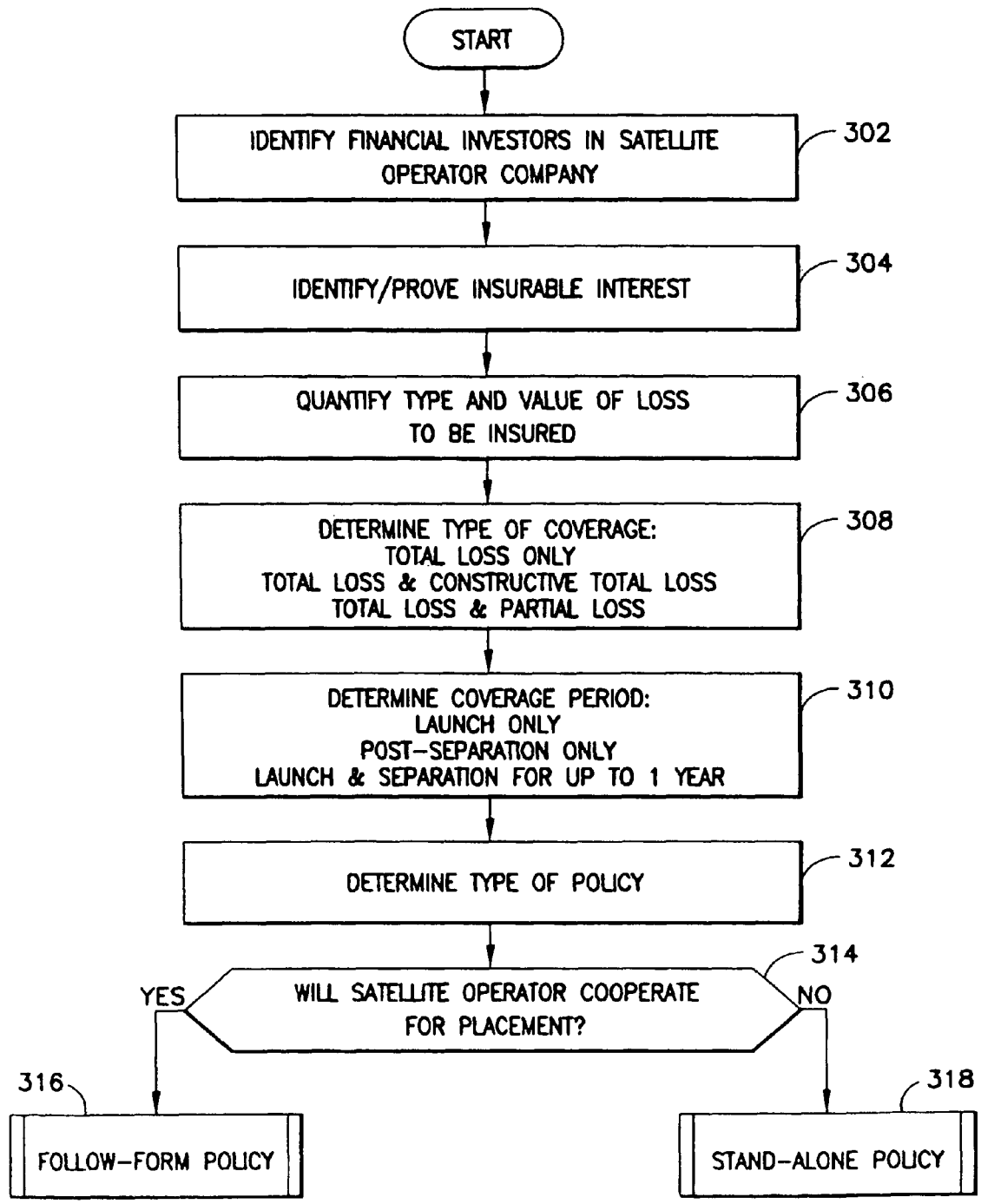
FIG. 3 illustrates steps in a method according to an example embodiment.

Referring to FIGS. 1 and 3, in an example embodiment, at step 302, system 100 identifies financial investors 108 in a satellite operator company 102.

At step 304, system 100 identifies and/or proves that investors 108 have an insurable interest.

At step 306, system 100 quantifies the type and value of loss to be insured.

At step 308, system 100 determines the type of coverage. Types of coverage may include but are not limited to: total loss only; total loss and constructive total loss; and total loss and partial loss.

At step 310, system 100 determines the coverage period. Coverage periods may include but are not limited to: launch only; post-separation only; launch and post-separation for up to 1 year.

At step 312, system 100 determines the type of policy, using information determined and identified in steps 302-310.

At step 314, system 100 determines whether satellite operator 102 will cooperate in placement of the policy.

Figure 4:
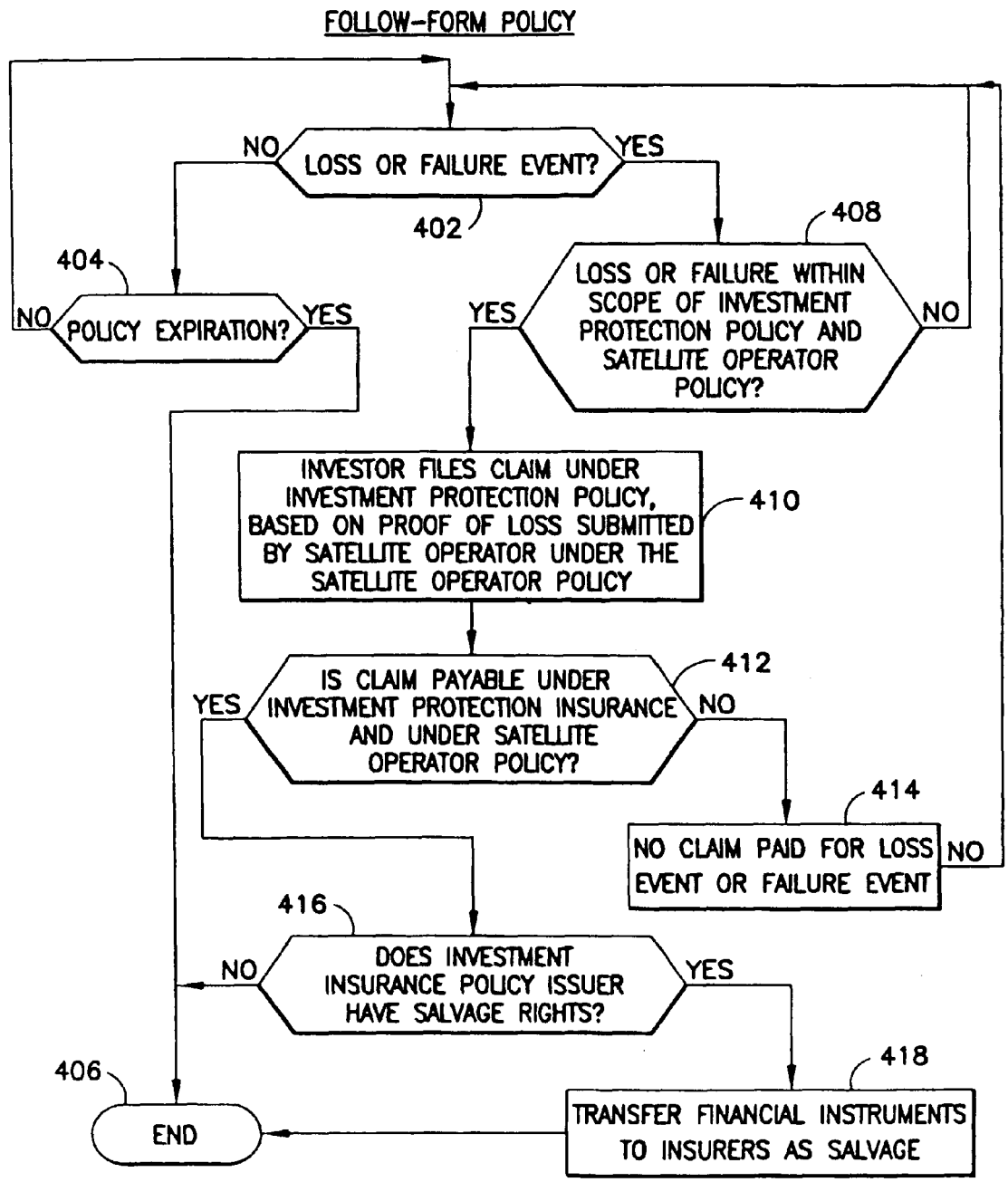
FIG. 4 illustrates steps in a method according to an example embodiment.

If at step 314, system 100 determines that satellite operator 102 will cooperate, then at step 316, system 100 issues a follow-form policy. FIG. 4 illustrates additional steps involved in the issue of a follow-form policy.

Figure 5:
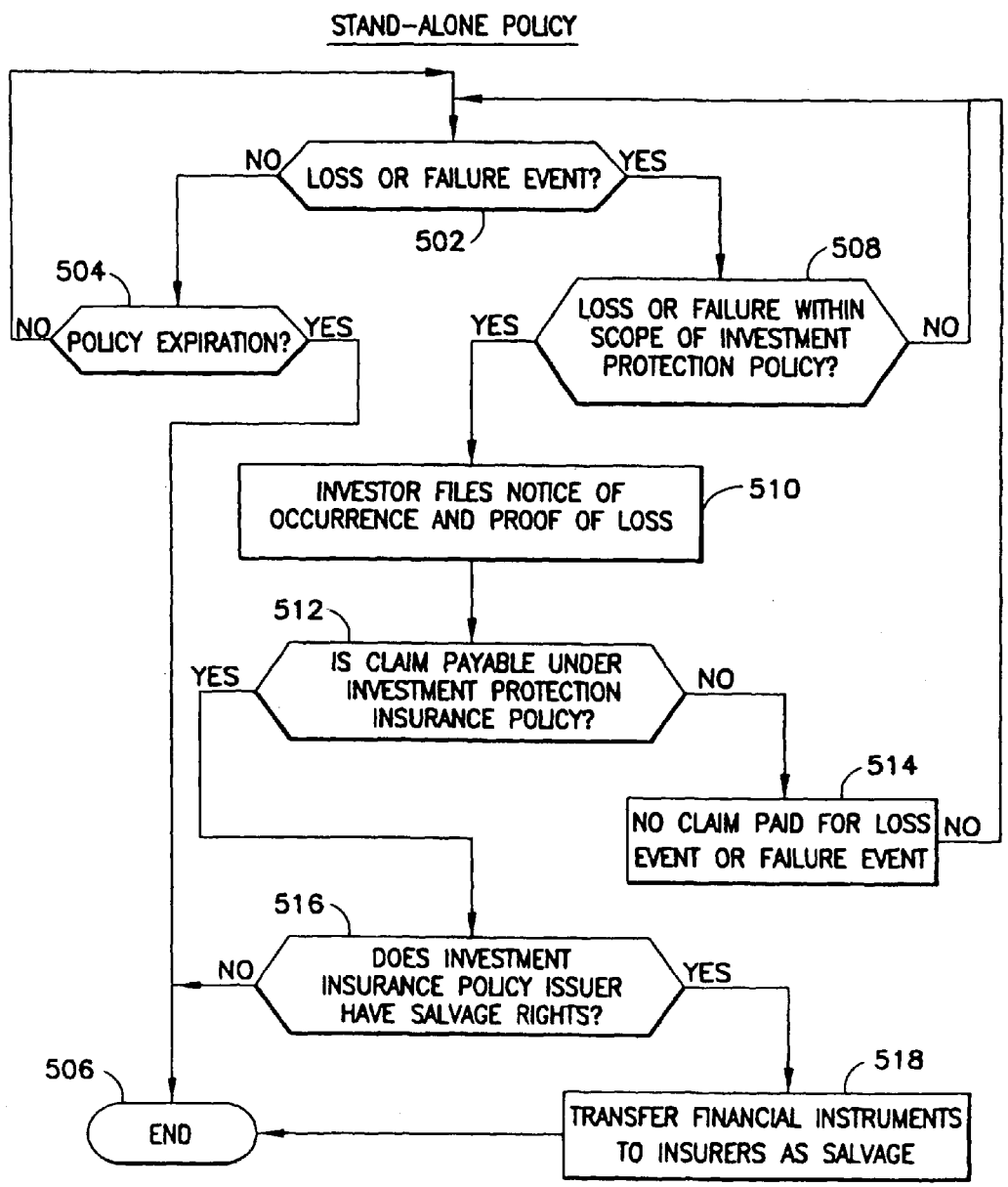
FIG. 5 illustrates steps in a method according to an example embodiment.

If at step 314, system 100 determines that satellite operator 102 will not cooperate, then at step 318, system 100 issues a stand-alone policy. FIG. 5 illustrates additional steps involved in the issue of a stand-alone policy.

Referring to FIGS. 1 and 4, after system 100 issues a follow-form policy at step 316, system 100 determines at step 402 whether there has been a failure event or loss event.

If at step 402 system 100 determines that there has not been a failure event or loss event, then at step 404 system 100 determines whether the policy has expired.

If the policy has not expired, then system 100 loops to step 402. If the policy has expired, then at step 406 the process ends.

If at step 402 system 100 determines that there has been a failure event or loss event, then at step 408 system 100 determines whether the failure event or loss event is within the scope of the investment protection policy and the satellite operator policy.

If the failure event or loss event is not within the scope of the investment protection policy and the satellite operator policy, then system 100 loops to step 402.

If the failure event or loss event is within the scope of the investment protection policy and the satellite operator policy, then at step 410, investor(s) 108 file claims under the investment protection policy. The investor claims are based on proof of loss submitted by the satellite operator under the satellite operator policy.

At step 412, system 100 determines whether the claim is payable under the investment protection insurance and under the satellite operator policy.

If the claim is not payable under the investment protection insurance and under the satellite operator policy, no claim is paid at step 414 for the failure event or the loss event, and system 100 loops to step 402.

If the claim is payable under the investment protection insurance and under the satellite operator policy, then at step 416, system 100 determines whether the issuer of the investment protection insurance has salvage rights.

If the issuer of the investment protection insurance has salvage rights, then at step 418, the financial instruments are transferred to the insurer or any future upside in financial instrument performance may be shared, in either case, as salvage and the process ends at step 406.

If the issuer of the investment protection insurance has no salvage rights, then the process ends at step 406.

Referring to FIGS. 1 and 5, after system 100 issues a stand-alone form policy at step 318, system 100 determines at step 502 whether there has been a failure event or loss event.

If at step 502 system 100 determines that there has not been a failure event or loss event, then at step 504 system 100 determines whether the policy has expired.

If the policy has not expired, then system 100 loops to step 502. If the policy has expired, then at step 506 the process ends.

If at step 502 system 100 determines that there has been a failure event or loss event, then at step 508 system 100 determines whether the failure event or loss event is within the scope of the investment protection policy.

If the failure event or loss event is not within the scope of the investment protection insurance policy, then system 100 loops to step 502.

If the failure event or loss event is within the scope of the investment protection policy, then at step 510, investor(s) 108 file a notice of occurrence and proof of loss under the investment protection insurance policy.

At step 512, system 100 determines whether the claim is payable under the investment protection insurance policy.

If the claim is not payable under the investment protection insurance policy, no claim is paid at step 514 for the failure event or the loss event, and system 100 loops to step 502.

If the claim is payable under the investment protection insurance policy, then at step 516, system 100 determines whether the issuer of the investment protection insurance policy has salvage rights.

If the issuer of the investment protection insurance policy has salvage rights, then at step 518, the financial instruments are transferred to the insurer or any future upside in financial instrument performance may be shared, in either case, as salvage, and the process ends at step 506.

If the issuer of the investment protection insurance has no salvage rights, then the process ends at step 506.

Figure 6:
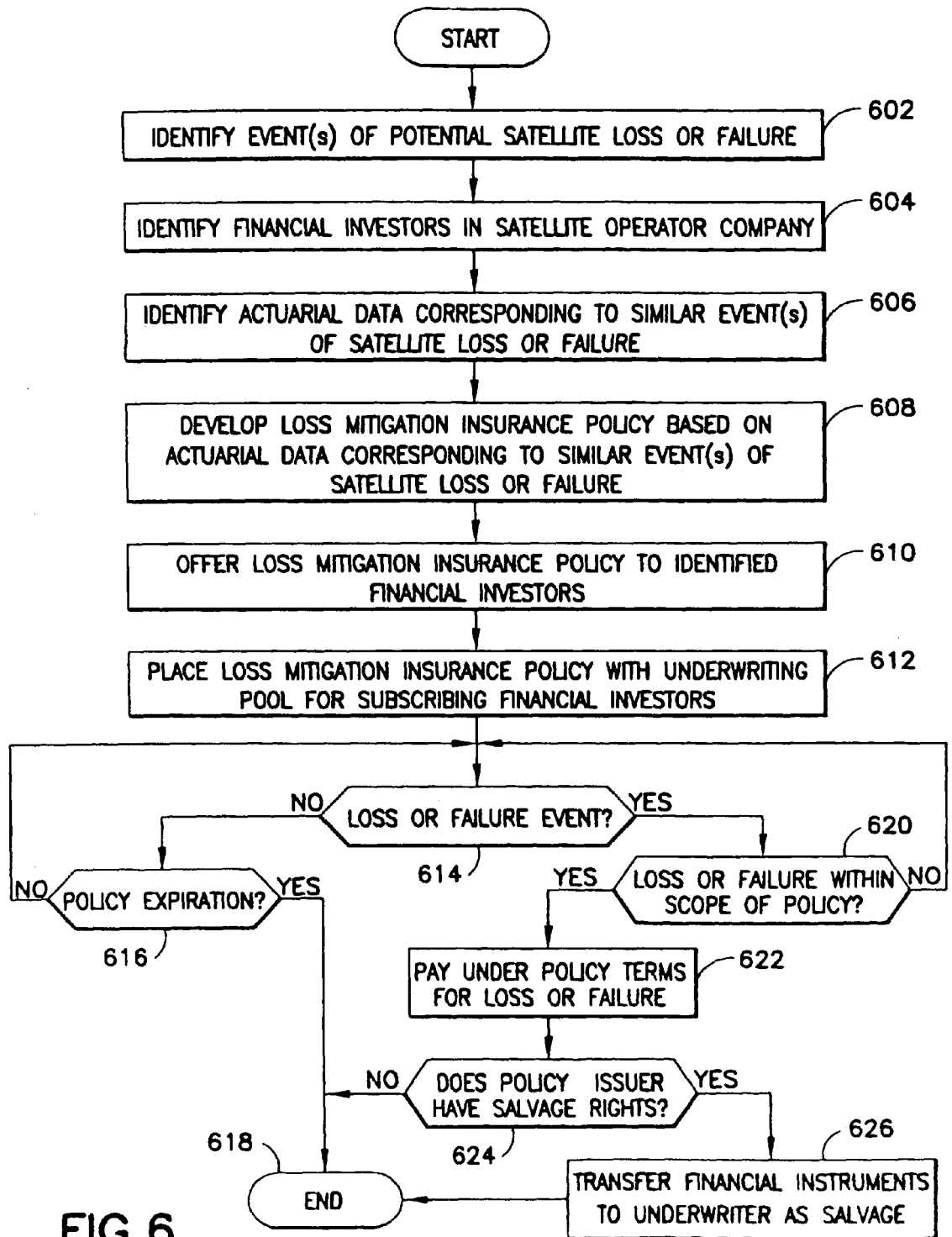
FIG. 6 illustrates steps in a method according to an example embodiment.

Referring to FIGS. 1 and 6, another example method begins at step 602 with system 100 identifying events of potential satellite loss or failure. There are many possible loss or failure events, some of which might include: failure before hold-down release; failure during main engine burn; booster separation failure; on-orbit check-out failure; total on-orbit power or propellant loss; and partial on-orbit power or propellant loss.

At step 604, system 100 then identifies a plurality of individual investors 108 who have invested in the satellite operator 102 and are interested in purchasing investment loss mitigation insurance.

At step 606, system 100 identifies actuarial data corresponding to similar events of satellite loss or failure.

At step 608, system 100 develops an investment loss mitigation insurance policy based on actuarial data corresponding to similar events of satellite loss or failure.

At step 610, system 100 offers the investment loss mitigation insurance policy to the identified financial investors 108.

At step 612, system 100 places the investment loss mitigation insurance policy for subscribing investors 108 with an underwriting pool 110.

Once the policy has been placed, then at step 614 system 100 determines whether a loss or failure event has occurred.

If at step 614 system 100 determines that no loss or failure event has occurred, then at step 616, system 100 determines whether the policy has expired. If the policy has not expired, system 100 loops to step 614. If the policy has expired, system 100 ends at step 618.

If at step 614 system 100 determines that a loss or failure event has occurred, then at step 620, system 100 determines whether the loss or failure event is within the scope of the policy. If the loss or failure event is not within the scope of the policy, then system 100 loops to step 614.

If the loss or failure event is within the scope of the policy, then at step 622 system 100 pays investors 108 under the policy terms for the loss or failure event.

At step 624, system 100 determines whether the policy issuer has any salvage rights, and if not, the process ends.

If at step 624, system 100 determines whether that the policy issuer has salvage rights, then at step 626 the financial instruments are transferred to the underwriter or any future upside in financial instrument performance may be shared, in either case, as salvage, and the process ends.

In the various embodiments described herein, there has been reference to investment protection insurance and investment loss mitigation insurance. There is no conceptual difference between the two and the use of two different terms is not intended to imply a difference.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A method for mitigating risk of satellite investment loss, the method comprising:
    identifying by a computing system having at least one processor and at least one memory at least one satellite loss event or failure event for a satellite that will be operated by a satellite operator company;
    identifying by the computing system actuarial data corresponding to prior satellite loss events or failure events substantially corresponding to the at least one satellite loss event or failure event, wherein the identified actuarial data considers historic differences between average financial performance of debt or equity instruments of satellite operator companies for a period of time immediately before and immediately after a satellite loss event or failure;
    developing by the computing system an investment loss mitigation insurance policy based at least in part on the identified actuarial data;
    offering by the computing system the investment loss mitigation insurance policy to financial investors holding debt or equity instruments of the satellite operator company; and
    placing by the computing system the investment loss mitigation insurance policy with an underwriting pool.

2. A method according to claim 1, further comprising identifying an actual satellite loss event or failure event;
    determining whether the actual satellite loss event or failure event is covered by the investment loss mitigation insurance policy; and
    responsive to determining whether the actual satellite loss event or failure event is covered, paying the financial investors.

3. A method according to claim 1, further comprising identifying an actual satellite loss event or failure event;
    determining whether the underwriting pool has salvage rights under the investment loss mitigation insurance policy; and
    responsive to determining whether the underwriting pool has salvage rights, transferring financial instruments to the underwriting pool as salvage.

4. A method according to claim 1, further comprising identifying an actual satellite loss event or failure event;
    determining whether the underwriting pool has salvage rights under the investment loss mitigation insurance policy; and
    responsive to determining whether the underwriting pool has salvage rights, sharing any future upside in financial instrument performance as salvage.

5. A method according to claim 1, wherein the at least one satellite loss event or failure event is a launch failure.

6. A method according to claim 1, wherein the at least one satellite loss event or failure event is a launch loss.

7. A method according to claim 1, wherein the at least one satellite loss event or failure event is an in-orbit failure.

8. A method according to claim 1, wherein the at least one satellite loss event or failure event is a premature in-orbit loss of capacity.

9. A method according to claim 1, wherein offering the investment loss mitigation insurance policy to financial investors occurs a predetermined number of days before launch.

10. A method according to claim 1, wherein offering the investment loss mitigation insurance policy to financial investors occurs after successful in-orbit check-out and a predetermined number of days before annual expiry.

11. A method according to claim 1, wherein the underwriting pool is at least partially in a financial products market.

12. A method according to claim 1, wherein the underwriting pool is at least partially in a satellite property insurance underwriting market.

13. A method according to claim 1 further comprising determining the final pool of investors and the adjusted value of their investment in the satellite operator company.

14. A method according to claim 1 further comprising determining the final insured amount at the time of attachment of risk.

15. A method according to claim 1, wherein the at least one satellite loss event or failure event for a satellite is a total loss.

16. A method according to claim 1, wherein the at least one satellite loss event or failure event for a satellite is a partial loss.

17. A method according to claim 1, wherein the at least one satellite loss event or failure event for a satellite is a reduction in expected lifetime.

18. A method according to claim 1, wherein the at least one satellite loss event or failure event for a satellite is a reduction in available power.

19. A computer-readable medium having computer executable software code stored thereon, the code for mitigating risk of satellite investment loss the code comprising:
    code to identify at least one satellite loss event or failure event for a satellite that will be operated by a satellite operator company;
    code to identify actuarial data corresponding to prior satellite loss events or failure events substantially corresponding to the at least one satellite loss event or failure event wherein the identified actuarial data considers historic differences between average financial performance of debt or equity instruments of satellite operator companies for a period of time immediately before and immediately after a satellite loss event or failure;

code to develop an investment loss mitigation insurance policy based at least in part on the identified actuarial data;

code to offer the investment loss mitigation insurance policy to financial investors holding debt or equity instruments of the satellite operator company; and code to place the investment loss mitigation insurance policy with an underwriting pool.

20. A programmed computer for mitigating risk of satellite investment loss, comprising:

a memory having at least one region for storing computer executable program code; and a processor for executing the program code stored in the memory, wherein the program code comprises:

code to identify at least one satellite loss event or failure event for a satellite that will be operated by a satellite operator company;

code to identify actuarial data corresponding to prior satellite loss events or failure events substantially corresponding to the at least one satellite loss event or failure event wherein the identified actuarial data considers historic differences between average financial performance of debt or equity instruments of satellite operator companies for a period of time immediately before and immediately after a satellite loss event or failure;

code to develop an investment loss mitigation insurance policy based at least in part on the identified actuarial data;

code to offer the investment loss mitigation insurance policy to financial investors holding debt or equity instruments of the satellite operator company; and code to place the investment loss mitigation insurance policy with an underwriting pool.

* * * * *